(12) United States Patent
Kniajanski et al.

(10) Patent No.: US 7,727,434 B2
(45) Date of Patent: Jun. 1, 2010

(54) MEMBRANES AND METHODS OF TREATING MEMBRANES

(75) Inventors: Sergei Kniajanski, Clifton Park, NY (US); Gary William Yeager, Rexford, NY (US); Christopher James Kurth, Chaska, MN (US); Isaac Keene Iverson, Minnetonka, MN (US); Steven Duwayne Kloos, Chanhassen, MN (US); Leonard Timbrook Hodgins, Closter, NJ (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/205,925

(22) Filed: Aug. 16, 2005

(65) Prior Publication Data
US 2007/0039874 A1    Feb. 22, 2007

(51) Int. Cl.
*B01D 67/00* (2006.01)
*B01D 39/14* (2006.01)
*B01D 71/06* (2006.01)
*B29C 44/04* (2006.01)

(52) U.S. Cl. .............. 264/48; 210/500.38; 210/500.39; 210/490; 210/500.27; 427/244

(58) Field of Classification Search .......... 210/500.27, 210/490, 500.37, 500.38, 500.39; 264/48–49, 264/41, 45.1, 45.5; 427/244, 245, 246, 340; 96/4
See application file for complete search history.

(56) References Cited

U.S. PATENT DOCUMENTS

| 3,133,132 | A | | 5/1964 | Loeb et al. |
| 3,133,137 | A | | 5/1964 | Loeb et al. |
| 3,567,632 | A | | 3/1971 | Richter et al. |
| 3,744,642 | A | * | 7/1973 | Scala et al. ............ 210/500.21 |
| 3,951,920 | A | * | 4/1976 | Senoo et al. ................ 210/654 |
| 4,005,012 | A | * | 1/1977 | Wrasidlo .................... 210/654 |
| 4,129,559 | A | * | 12/1978 | Credali et al. ............... 528/337 |
| 4,277,344 | A | * | 7/1981 | Cadotte ...................... 210/654 |
| 4,755,897 | A | | 7/1988 | Howard |
| 4,783,346 | A | * | 11/1988 | Sundet ........................ 427/244 |
| 4,859,384 | A | * | 8/1989 | Fibiger et al. ............... 264/45.1 |
| 4,888,116 | A | * | 12/1989 | Cadotte et al. .............. 210/636 |
| 4,948,507 | A | * | 8/1990 | Tomaschke ............ 210/500.38 |

(Continued)

FOREIGN PATENT DOCUMENTS

GB        2390042        12/2003

OTHER PUBLICATIONS

J. Glater, S. Hong, M. Elimelech, "The search for a chlorine-resistant reverse osmosis membrane", *Desalination* 95 (1994) 325 Abstract.

(Continued)

*Primary Examiner*—Ana M Fortuna
(74) *Attorney, Agent, or Firm*—Mary Louise Gioeni (57) ABSTRACT

Membranes as well as a methods of treating membranes are disclosed. The method of treating a membrane includes contacting the membrane with a first solvent, contacting the membrane with an inert solvent, and contacting the membrane with an amine reactive compound. The first solvent includes a solvent having a Hansen solubility parameter in a range from about 10.0 to about 18. The membrane includes a polymer having an amine group.

14 Claims, 1 Drawing Sheet

U.S. PATENT DOCUMENTS

| | | | | |
|---|---|---|---|---|
| 4,960,517 | A | * | 10/1990 | Cadotte .................. 210/639 |
| 4,960,518 | A | * | 10/1990 | Cadotte et al. ............ 210/639 |
| 4,964,998 | A | * | 10/1990 | Cadotte et al. ............ 210/654 |
| 4,985,660 | A | * | 1/1991 | Cronk ..................... 315/82 |
| 5,019,264 | A | * | 5/1991 | Arthur ................. 210/500.37 |
| 5,049,282 | A | * | 9/1991 | Linder et al. ............. 210/651 |
| 5,096,586 | A | | 3/1992 | Kaner et al. |
| RE34,058 | E | * | 9/1992 | Arthur ................. 210/500.37 |
| 5,152,901 | A | * | 10/1992 | Hodgdon .................. 210/654 |
| 5,221,481 | A | * | 6/1993 | Schucker ................. 210/640 |
| 5,259,950 | A | * | 11/1993 | Shiro et al. .............. 210/490 |
| 5,271,843 | A | * | 12/1993 | Chau et al. ............... 210/654 |
| 5,358,745 | A | * | 10/1994 | Tran et al. ............... 427/333 |
| 5,525,236 | A | * | 6/1996 | Wilkinson ................ 210/651 |
| 5,582,725 | A | | 12/1996 | McCray et al. |
| 5,627,217 | A | * | 5/1997 | Rilling et al. ............. 521/50 |
| 5,733,602 | A | * | 3/1998 | Hirose et al. ............. 427/245 |
| 5,755,964 | A | | 5/1998 | Mickols |
| 5,828,708 | A | * | 10/1998 | Yang et al. ............... 375/334 |
| 5,843,351 | A | * | 12/1998 | Hirose et al. ............. 264/45.1 |
| 5,876,602 | A | | 3/1999 | Jons et al. |
| 5,922,203 | A | * | 7/1999 | Tomaschke ............ 210/500.37 |
| 6,024,873 | A | * | 2/2000 | Hirose et al. .......... 210/500.38 |
| 6,162,358 | A | * | 12/2000 | Li et al. ............... 210/500.38 |
| 6,251,120 | B1 | * | 6/2001 | Dorn ..................... 606/170 |
| 6,368,507 | B1 | * | 4/2002 | Koo et al. ............ 210/500.38 |
| 6,521,130 | B1 | * | 2/2003 | Kono et al. ............... 210/652 |
| 6,783,711 | B2 | * | 8/2004 | Kurth et al. ............... 264/41 |
| 6,837,381 | B2 | * | 1/2005 | Hirose ................... 210/490 |
| 6,837,996 | B2 | * | 1/2005 | Kurth et al. ........... 210/500.38 |
| 6,878,278 | B2 | * | 4/2005 | Mickols .............. 210/500.38 |
| 6,913,694 | B2 | * | 7/2005 | Koo et al. ............ 210/500.38 |
| 6,987,150 | B2 | * | 1/2006 | Kurth et al. ............... 525/535 |
| 7,138,058 | B2 | * | 11/2006 | Kurth et al. ........... 210/500.38 |
| 2003/0121857 | A1 | | 7/2003 | Kurth et al. |
| 2003/0125483 | A1 | | 7/2003 | Kurth et al. |
| 2003/0141242 | A1 | | 7/2003 | Kurth et al. |

OTHER PUBLICATIONS

S.N.P.E. Gaeta, E. Negri, E Drioli, "Chlorine resistance of polypiperazineamide membranes and modules", *Desalination* (1991), 83, 383 Abstract.

Konagaya, S. Kuzumoto, H. O. Wantanabe, "New reverse osmosis membrane materials with higher resistance to chlorine", *Journal of Applied Polymer Science*, (2000), 75, 1357.

R. Singh, Desalination, "Characteristics of a chlorine-resistant reverse osmosis membrane", (1994), 95, 27, Abstract.

S. Avolontis, W.T.Hansbury, Hodgkiess, "Chlorine degradation of aromatic polyamides", *Desalination*, 85 (1992) 321-334 Abstract.

S. Kongaya, M. Tokai, H. Kuzomoto , "Reverse osmosis performance and chlorine resistance of new ternary aromatic copolyamides comprising 3,3-diaminodiphenylsulfone and a comonomer with a carboxyl group", *J. Appld. Polymer Sci*, 80 (4) 505-513, (2000).

K.J.P. Orton, F.G. Soper and G. Williams, "The Chlorination of Anilides. Part III. N-Chlorination and C-Chlorination as Simultaneous Side Reactions", *J. Chem. Soc.* (1928) 998.

Kawaguchi and Tamura, "Chlorine-Resistant Membrane for Reverse Osmosis. I. Correlation Between Chemical Structures and Chlorine Resistance of Polyamides", *J. Applied Polymer Sci*.,29 (1984) 3359.

J.Y. Koo, R.J. Petersen J.E. Cadotte, Polymer Preprints, "ESCA Characterization of Chlorine-Damaged Polyamide Reverse Osmosis Membrane" , *Am Chem Soc Div Polym Chem*., 1986, 27(2), 391.

R. Singh, "Polyamide polymer solution behaviour under chlorination conditions", *J. Membrane Sci* 1994, 88, 285 Abstract.

J. Jegal, S.G. Min, K.-H. Lee, "Factors affecting the interfacial polymerization of polyamide active layers for the formation of polyamide composite membranes", *J.Appl.Polym.Sci*., 86 (2002) 2781-2787.

E.K. Lee, W.C. Babcock, R.P. Brass, P.A. Breshnahan, M.B. Chidlaw, "Novel Composite Membraes", *Technical completion Report for U.S. Department of Interior, Bureau of Reclamation*, DWRT, NTIS PB 83-243170, 1983.

J. Glater, M.R. Zachariah, S.B. McCray and M.R. McCutchan, "Reverse Osmosis Membrane Sensitivity to Ozone and Halogen Disinfectants", *Desalination*, 48 1983 (1-16).

N.P.Soice, A.C.Maladono, D.Y.Takigawa, A.D.Norman, W.B. Krantz, A.R.Greenberg., "Oxidative degradation of polyamide reverse osmosis membranes: Studies of molecular model compounds and selected membranes", *J.Appl.Pol.Sci*., 90, (2003) 1173-1184.

N.P.Soice, A.R.Greenberg, W.B.Krantz, A.D.Norman, "Studies of oxidative degradation in polyamide RO membrane barrier layers using pendant drop mechanical analysis", *J. of Membrane Sci*., 243 (2004) 345-355.

S.Wu, C. Zheng, G. Zheng, "Truly chlorine-resistant polyamide reverse osmosis composite membrane", *J. Appld. Polymer Sci.* 61, 1996, 1147.

* cited by examiner

MEMBRANES AND METHODS OF TREATING MEMBRANES

BACKGROUND

The invention includes embodiments that relate to membranes and methods of treating a membrane. Particularly, the invention includes embodiments directed to membranes having a polymeric layer produced by interfacial polymerization and methods of treating such membranes.

DESCRIPTION OF RELATED ART

Some methods of improving some membrane performance by post-treatment are known. For example, the use of aqueous and/or alcoholic solvents as a medium for post treatment of membranes is disclosed. Although aqueous and/or alcoholic solvents may be useful mediums for post treatment reagents that are not highly reactive with water and/or alcohols, aqueous and/or alcoholic solvents may not be useful for reacting a membrane with alcohol or water reactive post treatment reagents, such as amine reactive compounds. Treating a membrane with an amine reactive compound in aqueous and alcoholic solvents is known. However, the aqueous or alcoholic solvents can lead to undesirable competitive reaction with the amine reactive compound, thus limiting the reaction of the amine reactive compound with the membrane.

Consequently, new membranes with performance characteristics and methods of treating membranes are still needed. Particularly, new methods of treating membranes are still needed that retain or improve membrane performance, such as chlorine resistance.

BRIEF DESCRIPTION

The purpose and advantages of embodiments of the invention will be set forth and apparent from the description that follows, as well as will be learned by practice of the embodiments of the invention. Additional advantages will be realized and attained by the methods and systems particularly pointed out in the written description and claims hereof, as well as from the drawings.

Membranes and methods of treating a membrane with amine reactive compounds in a solvent inert to the amine reactive compound are disclosed.

An embodiment of the invention provides a method for treating a membrane. The method includes: (i) contacting the membrane with a first solvent having a Hansen solubility parameter in a range from about 10.0 to about 18.0 $(cal/cm^3)^{1/2}$; (ii) contacting the membrane with an inert solvent; and (iii) contacting the membrane with an amine reactive compound. The membrane comprises a polymer having an amine group.

Another embodiment provides a membrane. The membrane includes a polymeric layer comprising nitrogen-comprising groups. Greater than 50 mol % of the nitrogen comprising groups are converted primary amines or secondary amines.

Another embodiment provides a membrane. The membrane has a polymeric layer produced by interfacial polymerization of at least one monomer comprising nitrogen. The polymeric layer shows a $^{15}N$-nuclear magnetic resonance spectrum having a peak with an area from an amine nitrogen and a peak with an area from an amide, urethane, or urea. The amine nitrogen peak area is less than about 8% of the amide, urethane, or urea nitrogen peak area.

Another embodiment provides a polycarboxylic acid amide membrane. The polycarboxylic acid amide membrane retains at least 50% of a NaCl rejection property after being exposed to at least 1000 ppm aqueous chlorine at a pH in a range from about 7 to about 8.2 for at least 120 hours.

The accompanying FIGURE, which is incorporated in and constitutes part of this specification, is included to illustrate and provide a further understanding of the method and system of the invention. Together with the description, the drawings serve to explain the principles of the invention.

DETAILED DESCRIPTION

Reference will now be made in detail to exemplary embodiments of the invention, which are illustrated in the accompanying FIGURES and examples. Referring to the drawings in general, it will be understood that the illustrations are for the purpose of describing a particular embodiment of the invention and are not intended to limit the invention thereto.

Whenever a particular embodiment of the invention is said to comprise or consist of at least one element of a group and combinations thereof, it is understood that the embodiment may comprise or consist of any of the elements of the group, either individually or in combination with any of the other elements of that group. Furthermore, when any variable occurs more than one time in any constituent or in formula, its definition on each occurrence is independent of its definition at every other occurrence. Also, combinations of substituents and/or variables are permissible only if such combinations result in stable compounds.

Figure 1:
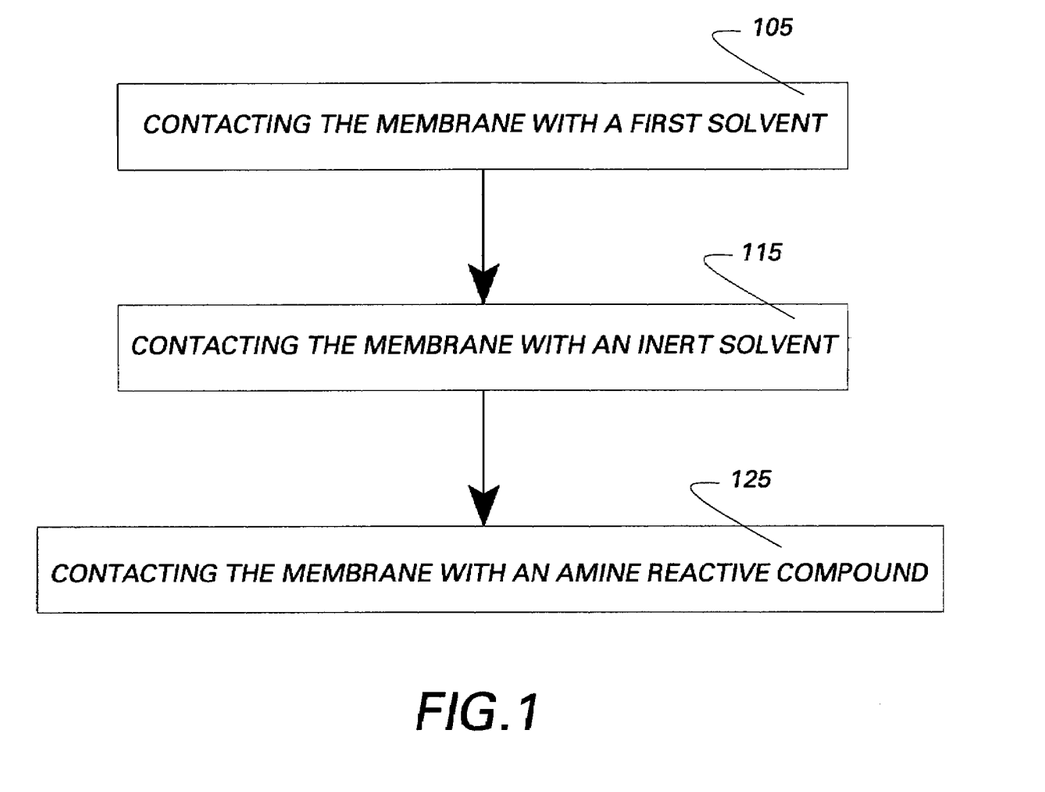
FIG. 1 a flow chart of a method of treating a membrane in accordance with an embodiment of the invention.

With reference to FIG. 1, a flow chart of an embodiment of a method of treating a membrane is described. An embodiment of the method of treating a membrane includes, at Step 105, contacting the membrane with a first solvent having a Hansen solubility parameter in a range from about 10.0 to about 18.0 $(cal/cm^3)^{1/2}$. The membrane comprises a polymer having an amine group. Step 115 includes contacting the membrane with an inert solvent. Step 125 includes contacting the membrane with an amine reactive compound.

Examples of membranes to be treated include, but are not limited to, thin film composite membrane, reverse osmosis membrane, hyperfiltration membrane, and nanofiltration membrane. Examples of the treated membranes include, but are not limited to, reverse osmosis membrane, hyperfiltration membrane, and nanofiltration membrane.

Microfiltration is a separation process that utilizes membranes having pores of sizes from about 0.1 microns to about 10 microns. Ultrafiltration is a separation process that utilizes membranes having defined pores of sizes of about 1 nm to about 0.1 microns. Ultrafiltration membranes are often characterized by their "molecular weight cut-off", a technique that defines the ability of ultrafiltration membranes to separate polymers from a solvent. A molecular weight cut-off method is described in ASTM method E1343-90(1997)e1: "Standard Test Method for Molecular Weight Cutoff Evaluation of Flat Sheet Ultrafiltration Membranes".

Nanofiltration is a process where a favorable portion of at least one small agent (typically less than 1000 daltons or a salt) passes through the membrane with the solvent and a desirable amount of at least one other small agent (typically less than 1000 daltons or a salt) is retained. An example of a nanofiltration process is the desalting of a sugar solution, where 80% of the salt passes the membrane with the water and 95% of the sugar is retained by the membrane. In this example, the sugar and salt can be fractionated. Because nanofiltration is a process, the definition of a nanofiltration membrane is a membrane commonly used in nanofiltration processes.

Reverse osmosis is a process where the large majority of each agent in solution is retained by the membrane while the solvent passes through the membrane, with the common provision that at least one of the agents being removed in solution is small (less than 1000 daltons or a salt). Examples of reverse osmosis processes are the purification of seawater, where often less than 1% of the species in the seawater are found in the permeate. Because reverse osmosis is a process, the definition of a reverse osmosis membrane is a membrane commonly used in reverse osmosis processes.

It should be well understood that a membrane commonly termed a nanofiltration membrane can be capable of reverse osmosis and vice versa. For example, a common so-called nanofiltration membrane, Desal 5 DK, can retain greater than 99% of magnesium sulfate from water. In this case, because the large majority of the magnesium sulfate is retained and the permeate contains a low amount of this salt, the process is reverse osmosis. Therefore, this is an example of a reverse osmosis process using a "nanofiltration" membrane. Also, a common reverse osmosis membrane, Desal 3 SG, can pass hydrofluoric acid with water while retaining simple ions such as sodium, copper, and chloride. In this example, the membrane discriminates between the HF and the other small agents in solution, making it a nanofiltration process using a "reverse osmosis" membrane.

"Composite membrane" includes a membrane layered or coated on at least one side of a porous support material.

Contacting Membrane with First Solvent

In one embodiment of Step 105, the first solvent has a Hansen solubility parameter in a range from about 10.0 to about 13.0 $(cal/cm^3)^{1/2}$. In another embodiment, examples of the first solvent include, but are not limited to, ethanol, propanol, isopropanol, butanol, isobutanol, sec-butanol, pentanol, pyridine, tetrahydrofuran, 1,4-dioxane, and 1,3-dioxane, either individually or in any combinations thereof provided they are miscible. Other solvents with the suitable solubility parameters are described in Reference Handbook of Solubility Parameters and other Cohesive Parameters, $2^{nd}$ Edition, Allan F. M. Barton, CRC Press, Boca Raton.

Contacting Membrane with an Inert Solvent

In one embodiment of Step 115, the inert solvent includes a solvent that is not reactive with the amine reactive compound. Examples of inert solvents include solvents such as, but not limited to, an aliphatic or an aromatic hydrocarbon, wherein the number of carbons is in a range from about 6 to about 20, either individually or in any combinations thereof provided they are miscible. In another embodiment, examples of the inert solvents include, but are not limited to, an ether, a cyclic ether, a thioether, a cyclic thioether, a heterocyclic hydrocarbon, a halogenated hydrocarbon, or a carboxylic acid N,N-dialkylamide, either individually or in any combinations thereof provided they are miscible.

Polymers

As described above, the membrane comprises a polymer having an amine group. The polymer may be produced by interfacial polymerization. Interfacial polymerization includes a process widely used for the synthesis of thin film membranes for reverse osmosis, hyperfiltration, and nanofiltration. Interfacial polymerization includes coating a first solution, generally aqueous, of one or more nucleophilic monomers onto a microporous support; followed by coating a second solution, generally in an aliphatic solvent, containing one or more electrophilic monomers. The second solution is immiscible with the first solution. At the interface of the two solution layers, which lies near the surface of the microporous support, a thin film polymer is formed from condensation of the electrophilic and nucleophilic monomers and is adherent to the microporous support. The rate of thin film formation may be accelerated by heating or addition of catalysts.

Nucleophilic Monomers

Examples of nucleophilic monomers include, but are not limited to, amine containing monomers such as polyethylenimines; cyclohexanediamines; 1,2-diaminocyclohexane; 1,4-diaminocyclohexane; piperazine; methyl piperazine; dimethylpiperazine (e.g. 2,5-dimethyl piperazine); homopiperazine; 1,3-bis(piperidyl)propane; 4-aminomethylpiperazine; cyclohexanetriamines (e.g. 1,3,5-triaminocyclohexane); xylylenediamines (o-, m-, p-xylenediamine); phenylenediamines; (e.g. m-phenylene diamine and p-phenylenediamine, 3,5-diaminobenzoic acid, 3,5-diamonsulfonic acid); chlorophenylenediamines (e.g. 4- or 5-chloro-m-phenylenediamine); benzenetriamines (e.g. 1,3,5-benzenetriamine, 1,2,4-triaminobenzene); bis(aminobenzyl) aniline; tetraaminobenzenes; tetraaminobiphenyls (e.g. 3,3',4,4,'-tetraaminobiphenyl; tetrakis(aminomethyl)methane; diaminodiphenylmethanes; N,N'-diphenylethylenediamine; aminobenzamides (e.g. 4-aminobenzamide, 3,3'-diaminobenzamide; 3,5-diaminobenzamide; 3,5-diaminobenzamide; 3,3'5,5'-tetraaminobenzamide); aminobenzhydrazides; bis(aminobenzyl) anilines; bis(alkylamino)phenylenediamines (e.g. N,N'-dimethyl-1,3-phenylenediamine); melamine; mono (alkylamino)phenylenediamines (e.g. N-methyl-1,3-phenylenediamine); aminomethylpiperidine; triaminohydroxy-pyrimidines (e.g. 2,4,5-triamino-6-hydroxypyrimidine or 4,5,6-triamino-2-hydroxypyrimidine); triamino-pyrimidines (e.g. 2,4,6-triamino-pyrimidine or 4,5,6-triamino-pyrimidine); tetraamino pyrimidines (e.g. 2,4,5,6-tetra amino pyrimidine); pararosaniline; tris(aziridinyl)propionates (e.g. trimethylol propane-tris(β-(N-aziridinyl) propionate or penta-erythritol-tris-β-(N-aziridinyl) propionate), either individually or in any combinations thereof.

Particular nucleophilic monomers include triaminobenzene, piperazine, 4-aminomethylpiperidine, p-phenylene diamine ("PPD"), and m-phenylene diamine ("MPD"), either individually or in any combinations thereof. More particularly, nucleophilic monomers include m-phenylene diamine.

Electrophilic Monomers

Examples of electrophilic monomers include, but are not limited to, acid halide-terminated polyamide oligomers (e.g. copolymers of piperazine with an excess of isophthaloyl chloride); benzene dicarboxylic acid halides (e.g. isophthaloyl chloride or terephthaloyl chloride); benzene tricarboxylic acid halides (e.g. trimesoyl chloride or trimellitic acid trichloride); cyclohexane dicarboxylic acid halides (e.g. 1,3-cyclohexane dicarboxylic acid chloride or 1,4-cyclohexane dicarboxylic acid chloride); cyclohexane tricarboxylic acid halides (e.g.cis-1,3,5-cyclohexane tricarboxylic acid trichloride); pyridine dicarboxylic acid halides (e.g. quinolinic acid dichloride or dipicolinic acid dichloride); trimellitic anhydride acid halides; benzene tetra carboxylic acid halides (e.g. pyromellitic acid tetrachloride); pyromellitic acid dianhydride; pyridine tricarboxylic acid halides; sebacic acid halides; azelaic acid halides; adipic acid halides; dodecanedioic acid halides; toluene diisocyanate; methylenebis (phenyl isocyanates); naphthalene diisocyanates; bitolyl diisocyanates; hexamethylene diisocyanate; phenylene diisocyanates; isocyanato benzene dicarboxylic acid halides (e.g. 5-isocyanato isophthaloyl chloride); haloformyloxy benzene dicarboxylic acid halides (e.g. 5-chloroformyloxy isophthaloyl chloride); dihalosulfonyl benzenes (e.g. 1,3-benzenedisulfonic acid chloride); halosulfonyl benzene dicarboxylic acid halides (e.g. 3-chlorosulfonyl isophthaloyl chloride); 1,3,6-tri(chlorosulfonyl)naphthalene; 1,3,7 tri(chlorosulfonyl)napthalene; trihalosulfonyl benzenes (e.g. 1,3,5-trichlorosulfonyl benzene); cyclobutane dicarboxylic acid halide; piperazine-N-N'-diformyl halides; dimethyl piperazine-N,N-diformyl halides; xylylene glycol dihaloformates; benzenediol di-haloformates; benzenetriol trihaloformates; phosgene; diphosgene; triphosgene; N,N'-carbonyl diimidazole; isocyanuric acid-N,N',N"-triacetyl halide; isocyanuric acid-N,N'N"-tripropionyl halide; and cyclopentanetetracarboxylic acid halides, either individually or in any combinations thereof.

Particular electrophilic monomers include, but are not limited to, terephthaloyl chloride, toluene diisocyanate, trimellitic anhydride acid chloride, 1,3,6-(trichlorosulfonyl)naphthalene, 1,3,7-(trichlorosulfonyl)napthalene, 1,3,5-trichlorosulfonyl benzene, 5-isocyanato isophthaloyl chloride, 5-chloroformyloxy isophthaloyl chloride, 5-chlorosulfonyl isophthaloyl chloride, isophthaloyl chloride, and trimesoyl chloride, either individually or in any combinations thereof. More particular electrophilic monomers include trimellitic anhydride acid chloride, 5-isocyanato isophthaloyl chloride, 5-chloroformyloxy isophthaloyl chloride, 5-chlorosulfonyl isophthaloyl chloride, isophthaloyl chloride, and trimesoyl chloride, either individually or in any combinations thereof.

Examples of polymers include polyamide, polysulfonamide, polyacyl hydrazide, polyurethane, polyurea, and polyesteramides, either individually or in any combinations thereof.

Microporous Support:

In one example, for illustration and not limitation, microporous support includes a support material having a surface pore size in the approximate range from about 50 Angstroms to about 5000 Angstroms. The pore sizes should be sufficiently large so that a permeate solvent can pass through the support without reducing the flux of the composite. However, the pores should not be so large that the permselective polymer membrane will either be unable to bridge or form across the pores, or tend to fill up or penetrate too far into the pores, thus producing an effectively thicker membrane than 200 nanometers. U.S. Pat. No. 4,814,082 (W. J. Wrasidlo) and U.S. Pat. No. 4,783,346 (S. A. Sundet) are illustrative of methods of choosing and preparing a microporous support for interfacial TFC (thin film composite) membrane formation.

Non-limiting examples of the material forming the microporous support include polysulfone, polyether sulfone, polyacrylonitrile, cellulose ester, polypropylene, polyvinyl chloride, polyvinylidene fluoride and poly(arylether) ketones. Other porous materials might be used as well, such as ceramics, glass and metals, in a porous configuration. Those of ordinary skill in the art will be able to make the selection from among the suitable materials in the art. Particularly, polyether sulfones and especially polysulfones may be used because these materials are readily available, have desirable physical and chemical properties.

The thickness of the material forming the microporous support may be between about 75 and about 250 microns thick, although other thicknesses may be used. For example, a 25 microns thick microporous support permits production of higher flux films. In some cases, the microporous support may be relatively thick, for example, 2.5 cm or more, where aqueous solution is applied to only one side, which is subsequently contacted with the organic solution, forming the interface at which polymerization occurs. The polymeric microporous support may be reinforced by backing with a fabric or a non-woven web material. Non-limiting examples include films, sheets, and nets such as a nonwoven polyester cloth. The polymer of the microporous support may permeate through the pores, be attached on both sides of the support, or be attached substantially on one side of the support.

Contacting the Membrane with the Amine Reactive Compound

In one embodiment of Step 125, contacting the membrane with the amine reactive compound comprises reacting the amine reactive compound with the amine to form, for example, an amide, thioamide, urethane, iminourethane, or urea. In a particular embodiment, the amine includes a primary or secondary amine.

Examples of the amine reactive compound include, but are not limited to, carbonyl halide (e.g. benzoyl chloride, acetyl chloride); thiocarbonyl halide; haloformate (e.g. phenyl chloroformate, allyl chloroformate; halothioformate; aldehyde; thioaldehyde; $\alpha,\beta$-unsaturated ketone; $\alpha,\beta$-unsaturated thioketone; $\alpha,\beta$-unsaturated ester; $\alpha,\beta$-unsaturated thioester; $\alpha,\beta$-unsaturated dithioester; phenyl ester; phenylthioester; phenyldithioester; carbonate; thiocarbonate; dithiocarbonate; trithiocarbonate; lactone; thiolactone; dithiolactone; epoxies; isocyanate; isothiocyanate; pyrocarbonate; anhydride; sulfonyl halide; sulfinyl halide; sulfenyl halide; sulfuryl halide; phosphoryl halide; phosphonyl halide; phosphinyl halide; thiophosphoryl halide; thiophosphonyl halide; N-carboxysuccinimide; N-carboxyphthalimide; alkyl halides; succinimides; imidazoles; isocyanate; isothiocyanate; and cyanate ester; either individually or in any combinations thereof. Other examples of amine reactive compounds include electrophilic monomers as listed below. Further examples of amine reactive compounds include, but are not limited to, mixtures of carboxylic acid containing compounds (e.g. oligomers, polymers and copolymers) with dehydrating agents; carboxylic acids containing compounds with electrophilic monomers; amine containing compounds (e.g. oligomers, polymers and copolymers) with electrophilic monomers; hydroxyl containing compounds(e.g. oligomers, polymers and copolymers) with electrophilic monomers; thiol containing compounds (e.g. oligomers, polymers and copolymers) with electrophilic monomers. In a particular embodiment, the oligomers, polymers, and copolymers may be water soluble. Also included are the reaction products of the aforementioned mixtures. Such mixtures may further include compounds known to facilitate the reactions of dehydrating agents or electrophilic monomers with the carboxylic acid, amine, hydroxyl, and thiol containing compounds. Catalysts may be included to accelerate the reaction rate of the products of the reaction of mixtures with the membrane. The process described may further comprise further treatment steps, wherein the membrane is post-treated with the components of the aforementioned mixtures individually or simultaneously. Additional post-treatment steps may also be included such as further washing with any variety of solvent, oxidation, electron beam treatment, or irradiation.

In a particular embodiment of Step 125, contacting the amine group groups of the membrane with the amine reactive compound comprises transforming the amine groups into carbamates by an amine reactive compound. Transforming the amine groups into carbamates may be achieved by using chloroformates, carbonates or pyrocarbonates as the amine reactive compound. Non-limiting examples of such amine reactive compounds include methyl chloroformate; cyclopropylmethyl chloroformate; 1-methyl-1-cyclopropylmethyl chloroformate; diisopropylmethyl chloroformate; 9-fluorenylmethyl chloroformate; 9-(2-sulfo)fluorenylmethyl chloroformate; 2-furanylmethyl chloroformate; 2,2,2-tri-chloroethyl chlroformate; 2-haloethyl chloroformate; 2-iodoethyl chlroformate; 2-trimethylsilylethyl chlroroformate; 2-methylthioethyl chloroformate; 2-methylsulfonylethyl chlorofor- mate; 2-(p-toluenesulfonyl)ethyl chloroformate; 2-phosphonoethyl chloroformate; 1,1-dimethylpropynyl chloroformate; 1,1-dimethyl-3-(N,N-dimethylcarboxamido) propyl chloroformate; 1,1-diphenyl-3-(N,N-diethylamino) pro-pylchloroformate; 1-methyl-1-(1-adamantyl)ethyl chloroformate; 1-methyl-1-phenylethyl chloroformate; 1-methyl-1-(3,5-dimethoxyphenyl)ethyl chloroformate; 1-Methyl-1-(4-biphenylyl)ethyl chloroformate; 1-methyl-1-(p-phenylazophenyl)ethyl chloroformate; 1,1-dimethyl-2-haloethyl chloroformate; 1,1-dimethyl-2,2,2-trichloroethyl chloroformate; 1,1-dimethyl-2-cyanoethyl chloroformate; isobutyl chloroformate; t-butyl pyrocarbonate; t-amyl chloroformate; cyclobutyl chloroformate; 1-methylcyclobutyl chloroformate; cyclopentyl chloroformate; cyclohexyl chloroformate; 1-methylcyclohexyl chloroformate;1-adamantyl chloroformate; Isobornyl chloroformate; vinyl chloroformate; allyl chloroformate, cinnamyl chloroformate; phenyl chloroformate; 2,4,6-tri-t-butylphenyl chloroformate; m-nitrophenyl chloroformate; S-phenyl chloroformate; 8-quinolyl chloroformate; hydroxypiperidinyl chloroformate; 4-(1,4-dimethylpiperidinyl)chloroformate; 4,5-diphenyl-3-oxazolin-2-one chloroformate; benzyl chloroformate; 2,4,6-trimethylbenzyl chloroformate, p-methoxybenzyl chloroformate, 3,5-dimethoxybenzyl chloroformate, p-decyloxybenzyl chloroformate, p-nitrobenzyl chloroformate, a-nitrobenzyl chloroformate; 3,4-dimethoxy-6-nitrobenzyl-p-bromobenzyl chloroformate; chlorobenzyl chloroformate; 2,4-dichlorobenzyl chloroformate; p-cyanobenzyl chloroformate; o-(N,N-dimethylearboxamido)benzyl chloroformate; m-chloro-p-acyloxybenzyl chloroformate; p-(dihydroxyboryl)benzyl chloroformate; p-(phenylazo)benzyl chloroformate; p-(p'-methoxyphenylazo)benzyl chloroformate; 5-benzisoxazolylmethyl chloroformate; 9-anthrylmethyl chloroformate; diphenylmethyl chloroformate; phenyl(o-nitrophenyl)methyl chloroformate; di(2-pyridyl)methyl chloroformate; 1-methyl-1-(4-pyridyl)ethyl chloroformate; isonicotinyl chloroformate; S-benzyl thiochloroformate; piperidinylcarbonyl chloride; p-toluenesulfonylaminocarbonyl chloride; phenylarninothiocarbonyl chloride, 2,2-bis(4-hydroxyphenyl)propane chloroformate (bisphenol A chlroformate); 2,2-bis(3-chloro-4-hydroxyphenyl)propane chlroformate; 2,2-bis(3-bromo-4-hydroxyphenyl)propane chlrorformate; 2,2-bis(4-hydroxy-3-methylphenyl) propane chloroformate; 2,2-bis(4-hydroxy-3-isopropylphenyl)propane chlroroformate; bis(2-nitrophenyl)carbonate; bis(4-nitrophenyl)carbonate; bis-(2-carboxymethylphenyl) carbonate; polyethylene glycol bis(4-nitrophenyl carbonate); and polymers containing 2-(isocyanatoethyl)methacrylate, either individually or in any combinations thereof.

In another particular embodiment of Step 125, contacting the amine group groups of the membrane with the amine reactive compound comprises transforming the amine groups into amides by an amine reactive compound. Transforming the amine groups into amides may be achieved by the use of anhydrides or mixed anhydrides of carboxylic acids or the use of acyl halides, such as acyl chlorides as the amine reactive compound. Also useful are carboxylic acids in mixtures with dehydrating agents. Examples of dehydrating agents include dicyclohexylcarbodiimide, ethyl chloroformate or carbonyl imidazole, carboxylic acids esters, and carboxylic acid imidazolides. More particular examples of such amine reactive compounds include formic-acetic mixed anhydride; acetic anhydride; acetyl chloride; chloroacetic anhydride; chloroacetyl chloride; dichloroacetic anhydride; dichloroacetyl chloride; trichloroacetic anhydride or trichloroacetyl chloride; trifluoroacetic anhydride; trifluoroacetyl chloride, o-nitrophenylacetic anhydride; trichloroacetyl chloride; o-nitrophenoxyacetic anhydride; o-nitrophenoxyacetyl chloride, diketene, 2-(benzylthio)thiazol-5(4H)-one, phenylacetic anhydride; phenyl acetyl chloride; 3-phenylpropionic anhydride; phenylpropionyl chloride; phthalic anhydride; 4-chloroformylphthalic anhydride; 3-(p-hydroxyphenyl)propionic anhydride; 3-(p-Hydroxyphenyl)propionyl chloride; 3-(o-Nitrophenyl)propionic anhydride; 3-(o-nitrophenyl)propionyl chloride; 2-methyl-2-(o-nitrophenoxy)propionic anhydride; 2-Methyl-2-(o-nitrophenoxy)propionyl chloride; 2-methyl-2-(o-phenylazophenoxy)propionic anhydride; 2-methyl-2-(o-phenylazophenoxy) propionyl chloride; 4-chlorobutyric anhydride; 4-chlorobutyryl chloride; isobutyric anhydride; isobutyryl chloride; o-nitrocinnamic anhydride; o-nitrocinnamoyl chloride; picolinic acid and a dehydrating agent such as dicyclohexylcarbodiimide, ethylchloroformate or carbonyl dimidazole; N-acyl amino acids plus a dehydrating agent such as dicyclohexylcarbodiimide, ethylchloroformate or carbonyldiimidazole; benzoic anhydride; benzoyl chloride; benzoyl cyanide; o- or p-nitrophenylbenzoate; heptaflouorisopropyl benzoate; p-phenylbenzoic anhydride; p-phenylbenzoyl chloride; p-methoxybenzoic anhydride; p-methoxybenzoyl chloride, o-nitrobenzoic anhydride; o-nitrobenzoyl chloride; o-(benzoyloxymethyl)benzoic anhydride; o-(benzoyloxymethyl) benzoyl chloride; phthalic anhydride; phthaloyl methyl ester acid chloride; maleic anhydride; 2,3-diphenylmaleic anhydride; 2,4-dinitrophenyl acetate; acetic acid imidazolide or benzoic acid imidazolide, benzoic 2-sulfonic anhydride; benzoic methanesulfonic anhydride; polyethylene glycol mono- or biscarboxymethyl ether with a dehydrating agent; polyethylene glycol with an electrophilic monomer; polyethylene oxide 4-arm carboxylic acid terminated with a dehydrating agent; polyethylene oxide 4-arm carboxylic acid hydroxyl terminated with an electrophilic monomer; polyethylene oxide 4-arm carboxylic acid terminated with a dehydrating agent; polyacrylamide-co-acrylic acid with a dehydrating agent polyacrylic acid-co-maleic anhydride; polyazelaic anhydride; polyacrylonitrile-co-butadiene carboxy terminated with a dehydrating agent; block or random poly(α-amino acid)s in either d or l form (e.g. enzymes, antibodies and antigens) with a dehydrating agent; and polymethylvinyl ether-co-maleic anhydride.

Other amine reactive compound for transforming the amine groups into amides include amine reactive compounds such as the mixture or reaction product of polyethylene glycol with an electrophilic monomer; polyethylene glycol-block-polypropylene glycol-block-polyethylene glycol with an electrophilic monomer; polyethylene glycol-ran-polypropylene glycol monomethyl ether with an electrophilic monomer; polyethylene oxide 4-arm hydroxyl terminated with an electrophilic monomer; polyethylene oxide 4-arm amine terminated with an electrophilic monomer; polyethyleneamine with an electrophilic monomer; polyethyleneamine epichlorohydrin modified with an electrophilic monomer; an electrophilic monomer with polyhydroxyethyl acrylate, polyhydroxyethylmethacrylate, or copolymers of polyhydroxyethyl acrylate andpolyhydroxyethylmethacrylate; polyhydroxypropyl methacrylate, polyhydroxypropyl acrylate or copolymers of hydroxypropylmethacrylate or hydroxylpropylacrylate with an electrophilic monomer; poly(dimethylamine-co-epichlorohydrin) with an electrophilic monomer; polyepichlorohydrin-co-ethylene oxide with an electrophilic monomer, polyvinyl alcohol with an electrophilic monomer, and polyvinylacetate-co-polyvinylalcohol with an electrophilic monomer, either individually or in any combinations thereof.

In another particular embodiment of Step 125, contacting the amine group groups of the membrane with the amine reactive compound comprises transforming the amine groups into secondary or tertiary amines or quaternary ammonium salts by an amine reactive compound. Transforming the amine groups into secondary or tertiary amines or quaternary ammonium salts may be achieved by using amine reactive compounds such as epoxies, alkyl iodides, bromides, chlorides, sulfonates or enol ethers such as methyl iodide; benzyl chloride; benzyl iodide; benzyl bromide; methyl toluenesulfonate; bromoacetic acid; chloromethylmethyl ether; 2-chloroethylchloromethyl ether, benzylchloromethyl ether, dihydropyran; 3,4-dimethoxybenzyl chloride; o-nitrobenzyl chloride, triphenylmethyl chloride; p-methoxyphenyl)diphenylmethyl chloride, methyl acrylate; methyl methacrylate; dimethyl maleate; methylenebis acrylamide; ethylene diacrylate; 4,4'-bis(maleimido)diphenylmethane; pentaerythrytyl tetracrylate, and polyethylene glycol acrylate. Some examples of epoxies include, but are not limited to, butanediol diglycidyl ether; trimethylolpropane diglycidyl ether; phenyl glycidyl ether; bis(4-hydroxyphenyl)propane diglycidyl ether; bis(4-hydroxyphenyl)methane diglycidyl ether; epoxidized phenol-formaldehyde novolacs; epoxidized cresol-formaldehyde novolac and other epoxidized alkylphenol-formaldehyde novolacs; epoxidized 1,1,1-tris(4-hydroxyphenyl)ethane; epoxidized 1,1,2,2-tetra(4-hydroxyphenyl) ethane; epoxidized phenol-dicyclopentadiene novolacs; epoxidized phenol-benzaldehyde novolacs; polyethylene glycol diglycidyl ether; polyethylene glycol methacrylate; polyethylene glycol monomethylether methacrylate; polyethylene glycol monomethyl ether acrylate; polyethylene glycol reacted with bisphenol-A diglycidyl ether; polyepichlorohydrin-co-ethylene oxide; and polyethylene-co-methyl acrylate-co-glycidyl methacrylate, either individually or in any combinations thereof.

In another particular embodiment of Step 125, contacting the amine group groups of the membrane with the amine reactive compound comprises transforming the amine groups into ureas or thioureas by an amine reactive compound. Transforming the amine groups into ureas or thioureas may be achieved by using isocyanates or isothiocyanates as the amine reactive compound. Non-limiting examples of such isocyanates amine reactive compounds include phenylisocyanate, phenylisothiocyanate; 4,4'-methylene bis(phenylisocyanate); 4,4'-methylene bis(phenylisothiocyanate); 4,4'-methylene bis(3-chlorophenylisothiocyanate); and 4,4'-methylene bis(3-chlorophenylisocyanate), either individually or any combinations thereof.

In another particular embodiment of Step 125, contacting the amine group groups of the membrane with the amine reactive compound comprises transforming the amine groups into iminourethane by an amine reactive compound. Transforming the amine groups into iminourethane may be achieved by using cyanate esters as the amine reactive compound. Non-limiting examples of such cyanate ester amine reactive compounds include, but are not limited to, bis(4-cyanatophenyl)methane, bis(3-methyl-4-cyanatophenyl) methane, bis(3-ethyl-4-cyanatophenyl)methane, bis(3,5-dimethyl-4-cyanatophenyl)methane, 1,1-bis(4-cyanatophenyl)ethane, 2,2-bis(4-cyanatophenyl)propane, 2,2-bis(4-cyanatophenyl)1,1,1,3,3,3-hexafluoropropane, di(4-cyanatophenyl)ether, di(4-cyanatophenyl)thioether, di(4-cyanato-2,6-methylphenyl)thioether, di(4-cyanato-2-t-butyl-3-methylphenyl)thioether, 4,4-dicyanatobiphenyl, 1,3-bis(4-cyanatophenyl-1-(1-methylethylidene))-benzene, 1,4-bis(4-cyanatophenyl-1-(1-methylethylidene))benzene, and resorcinol dicyanate, either individually or in any combinations thereof.

Other sulfur and phophorus compounds useful as amine reactive compounds include, but are not limited to, diphenylphosphinyl chloride; dimethylthiophosphinyl chloride; diphenylthiophosphinyl chloride; benzenesulfenyl chloride; o-nitrobenzenesulfenyl chloride; 2,4-dinitrobenzenesulfenyl chloride; pentachlorobenzenesulfenyl chloride;, 2-nitro-4-methoxybenzenesulfenyl chloride; triphenyjmethylsulfenyl chloride; benzenesulfonyl chloride; p-methoxybenzenesulfonyl chloride; 2,4,6-trimethylbenzenesulfonyl chloride; toluenesulfonyl chloride; benzylsulfonyl chloride; p-methylbenzylsulfonyl chloride; trifluoromethylsulfonyl chloride, and phenacylsulfonyl chloride, either individually or in any combinations thereof.

Polyfunctional amine reactive compounds are also included wherein the amine reactive compound contains functional groups that are the same or different. The additional functionality may or may not be amine reactive. Examples of such compounds containing at least two functional groups are 4-chloroformylbenzyl chloride, maleic anhydride, itaconic anhydride, 4-chloro-3-nitrobenzoyl chloride, 4-chloro-3-nitrobenzenesulfonyl chloride, 4-chloromethylphenyl isocyanate, 3-maleimideethyl chloroformate, 3-chlorolformylbenzenesulfonyl chloride, 3-phenoxycarbonylbenzenesulfonyl chloride, 4-chloroformylphenyl chloroformate, 4-chloroformylphenyl isocyanate, N-(4-chloroformylphenyl)-o-phenylurethane, 4-chlorosulfonylphenyl chloroformate, 4-chlorosulfonylphenyl isocyanate, 4-isocyanatephenyl chloroformate, 4-chloroformylphthalic anhydride, 4-phenyloxy-carbonylphthalic anhydride, 4-chlorosulfonylphthalic anhydride, 4-chlorocarbonyl-oxyphthlic anhydride, and 4-phenoxycarbonyliminophthalic anhydride, either individually or in any combinations thereof.

Also included are amine reactive compounds that are oligomeric or polymeric. These polymers may have various microstructures including linear, branched, or dendritic microstructrures. They may be crystalline or amorphous. Examples of such oligomeric or polymeric include amine reactive compounds polyetherylene glycol 2,4-diisocyanate terminated, polypropylene glycol 2,4-diisocyanate terminated, poly(ethylene-b-propylene glycol) 2,4-diisocyanate terminated, polyethylene glycol diacrylate, and poly(ethylene glycol) dimethacrylate, either individually or in any combinations thereof.

Other examples of the amine reactive compound include the structure

R—X:

wherein R is selected from a group consisting of:

a)

$$\underset{\text{Y}}{\overset{\text{O}}{\|}}$$

b)

$$-\overset{\overset{\text{O}}{\|}}{\underset{\underset{\text{O}}{\|}}{\text{S}}}-\text{Y, and}$$

c)

$$\underset{\text{O}-\text{Y}}{\overset{\text{O}}{\|}}$$

wherein X, independently at each occurrence, includes Cl, Br, or I.

Y, independently at each occurrence, includes fluoro, chloro, bromo, iodo, $C_{1-500}$ alkyl alcohol, phenol, nitro, amide, imide, imino, $C_{1-500}$, alkyl, $C_{1-5100}$, alkoxy, $C_{1-500}$ alkyl ammonium, $C_{1-500}$ ammonium aryl, $C_{1-500}$ ammonium salt, $C_{1-500}$ alkyl phosphonium salt or $C_{6-500}$ aryl phosphonium salt, cyano, mercapto, nitro, carboxy, alkyl carboxylate, aryl carboxylate, S-alkylthioester, S-arylthioester, O-alkyl thioester, isocyanate, isothiocyanate, alkylcarbamate, O-alkyl carbamate, N-alkyl carbamate, $C_{1-5100}$ aliphatic acyl, $C_{6-500}$ aromatic acyl, ether, acetal, ketal, $C_{1-5100}$ alkyl sulfone, $C_{1-500}$ aryl sulfone, sulfonyl halide, phosphoryl halide, phosphonyl halide, $C_{1-500}$ alkyl phosphine oxide, $C_{6-500}$ aryl phosphine oxide, $C_{1-500}$ primary amide, $C_{1-500}$ secondary amide, $C_{1-500}$ tertiary amide, a $C_{3-500}$ monocyclic ring, $C_{3-500}$ bicyclic ring, $C_{3-500}$ polycyclic ring, or a heterocyclic ring such as a triazine, pyrimidine, pyridine, imidazole, pyrrolidine, piperidine, morpholine, or thiomorpholine. In another embodiment, Y is selected from a group consisting of alkyl, phenyl, phenyl, and benzyl. Y may optionally be substituted with carboxylic acids, sulfonic acid esters, quarternary ammonium or phosphonium salts, or polymers such as polyalylkylene glycols, functionalized polyvinyl alcohols, polyvinylethers, polyacrylic acids, poly(2-hydroxyethylacrylates), poly(vinyl pyrrolidinone)s, poly(oxazolines), polyesters, polyacrylamides, and copolymer thereof.

Optionally, the method further includes contacting the membrane with second solvent. The second solvent includes solvents having a Hansen solubility parameter in a range from about 22.0 to about 14.0 $(cal/cm^3)^{1/2}$, either individually or in any combinations thereof, provided the solvents are miscible. In one embodiment, the second solvent includes a protic solvent. In particular embodiment, the second solvent further comprises water. In yet a more particular embodiment, the second solvent further comprises methanol and water. Other examples of the second solvent include, but are not limited to, ethanol, propanol, isopropanol, butanol, ethylene glycol, propylene glycol, glycerol and mixtures thereof with water, either individually or in any combinations thereof.

It should be appreciate that the first, second, or inert solvents may comprise a plurality of solvents. For example, the first, second, or inert solvents may be used as binary or ternary systems by combination with other solvents, anti-solvents or additives.

The method is not limited by when the first, inert and second solvents are provided. In one embodiment, the first, inert and second solvents are provided sequentially.

The polymer may further include additives and adjunct materials. Examples of additives and adjunct materials include plasticizers, ionicity enhancers, wetting agents such as surfactants, desorption agents, surface modifiers, smoothing agents, acid acceptors, flux enhancing agents, drying agents, antifoaming agents, thickeners and defoaming agents. Other example of additives and materials are described in U.S. Pat. Nos. 4,948,507; 4,983,291; and 5,658,460.

Examples of other additives and adjunct materials include ammonium salts of acids, primary, secondary, and tertiary ammonium salts of acids, quaternary ammonium salts of acids, glycols, organic acids, saccharides, and the like. Examples include glycerin, citric acid, glycols, glucose, sucrose, triethylammonium camphorsulfonate, triethylammonium benzenesulfonate, triethylammonium toluenesulfonate, triethylammonium methane sulfonate, ammonium camphor sulfonate, and ammonium benzene sulfonate. The method is not limited by when the additives and adjunct materials are provided. The additives and adjunct materials may be provided to the polymers by adding the additives and adjunct materials Furthermore, catalysts may also be used to aid in the treatment of the membrane. Examples of catalysts include, but are not limited to, diethylamine, triethylamine, ethylene diamine, triethanolamine, diethanolamine, ethanolamine, dimethylaminopyridine.

The membrane may be further processed to remove residual chemicals, to adjust performance, and/or to apply a protective coating. After such optional treatment, the membrane may be used or may be stored for later use.

Another aspect of the invention also includes membranes. The membranes can be used in various applications such as, nanofiltration, reverse osmosis, piezodialysis, gas separations, pervaporation, and membrane distillation. The membrane allows improved chlorine resistance. The membranes may include one or more of increased solute permeation rate, increased salt rejection, improved solvents separation coefficient, and improved stability toward biofouling.

In one aspect, the membrane includes a polymeric layer comprising nitrogen-comprising groups. Greater than 50 mol % of the nitrogen-comprising groups are converted primary amines or secondary amines. In a particular embodiment, greater than 70 mol % of the nitrogen-comprising groups are converted primary amines or secondary amines. In another particular embodiment, greater than 90 mol % of the nitrogen-comprising groups are converted primary amines or secondary amines. In yet another particular embodiment, 100% mol % of the nitrogen-comprising groups are converted primary amines or secondary amines.

In one embodiment, the converted primary amines or secondary amines are converted into an amide, thioamide, urethane, iminourethane, or urea. The converted primary amines or secondary amines may be converted by the methods described hereinabove.

In another aspect, the membrane has one or more polymeric layers produced by interfacial polymerization of at least one monomer comprising nitrogen. The polymeric layer shows a $^{15}$N-nuclear magnetic resonance spectrum having a peak with an area from an amine nitrogen and a peak with an area from an amide, urethane or urea. The amine nitrogen peak area is less than about 8% of the amide, urethane or urea nitrogen peak area. In a particular embodiment, the amine nitrogen peak area is less than about 4% of the amide, urethane or urea peak area. In another particular embodiment, the amine nitrogen peak area is less than about 1% of the amide, urethane or urea peak area.

In a further particular embodiment, examples of the polymers include, but are not limited to, polyamide, polysulfonamide, polyacylhydrazide, polyurethane, and polyurea, either individually or in combinations thereof. In a still further particular embodiment, examples of the polymers include, but are not limited to, a polyamide formed by interfacial polymerization of an acyl chloride and an amine. Examples of acyl chlorides include, but are not limited to, trimesoyl chloride; isophthaloyl chloride; terephthaloyl chloride; cyclopentanoyl tetracarboxylic acid chloride; cyclohexane tricarbonyl chloride; 1,3,6-napthalene trisulfonyl chloride; 1,3,7-napthalene trisulfonyl chloride; 1,3,5-benzene trisulfonyl chloride; 1,3-phenyl-enedimethanesulfonyl chloride; and benzene-1,3,5-triyltrimethanesulfonyl chloride, either individually or in combinations thereof. Examples of amines include, but are not limited to, 1,3,5-triaminobenzene; m-phenylenediamine; p-phenylene diamine, piperazine; ethylene diamine; diaminodiphenylsulfone; 3,5-diamino-N-(3,5-diamino-phenyl) benzamide; diethylene triamine; and triethylenetetraamine, either individually or in combinations thereof.

In one embodiment, the membrane has improved chlorine resistance. Improved chlorine resistance includes retaining at least 50% of a NaCl rejection property after being exposed to at least 1000-ppm aqueous chlorine at a pH in a range from about 7 to about 8.2 for at least 120 hours. Exposed means being immersed into the solution. In a particular embodiment, the membrane is polycarboxylic acid amide membrane. In a more particular embodiment, the polycarboxylic acid amide membrane is a thin film composite membrane. In other embodiment, the membrane retains at least 60-70%, 71-80%, 81-90%, or greater than 90% of the NaCl rejection property.

EXAMPLES

The term "A value" represents the water permeability of a membrane and is represented by the cubic centimeters of permeate water over the square centimeters of membrane area times the seconds at the pressure measured in atmospheres. An A value of 1 means a 1 $cm^3$ of permeate over the multiplicand of 1 centimeter squared of membrane area times 1 second of performance at a net driving pressure of one atmosphere. In the context of the present invention, A values given herein have the following unit designation: cm/(sec.atm) at 25° C.

The term "net driving pressure" is equal to the average trans-membrane pressure minus the feed-permeate osmotic pressure difference.

Flux-rejection behavior tests (A value and % of salt passage) of 17 membranes (examples 1-12 and 14-18) were conducted. The examples were conducted using different amine reactive compounds, different post-treatment methods, and different chlorine stability test. Examples were performed using 5.08 cm diameter membrane disks installed into "dead-end" high pressure filtration cells (Sterlitech Corporation, Kent, Wash., USA) provided with magnetic stirrers. The test results are listed in Table 1 and "% PAS refers to % salt passage. Reverse osmosis membranes (Osmonics AG™ by GE Water & Process Technologies Equipment Division 5951 Clearwater Drive Minnetonka, Minn., USA) were used in the examples.

Deionized water (DW) was pumped through membrane samples for 30 minutes under 15.5-16.5 atm static pressure followed by pressure release. This operation was repeated once again, and internal surface of the filtration cell was rinsed with 2000 ppm NaCl aqueous solution. The filtration unit was charged with 100 ml of 2000 ppm NaCl aqueous solution. After first 20 ml of fluid were pumped through the membrane, following 15 ml were collected for analysis. Salt concentrations in both original solution and filtrates were determined by their electric conductivity.

Example 1

A 5.08 cm diameter disk punched out membrane was kept in 150 ml of 1000 ppm NaOCl solution in deionized water (pH=8.2) in darkness. After 35hours of exposure to NaOCl, the membrane was thoroughly rinsed with DW, and flux-rejection behavior of the membrane was tested (Table 1).

Example 2

A 5.08 cm diameter disk punched out membrane (GE Osmonics) was kept in 150 ml of 1000 ppm NaOCl solution in deionized water buffered to pH=8.0 in darkness. After 35 hours of exposure to NaOCl, the membrane was thoroughly rinsed with DW, and flux-rejection behavior of the membrane was tested (Table 1).

Example 3

A 5.08 cm diameter disk punched out membrane (GE Osmonics) was kept in 150 ml of 1000 ppm NaOCl solution in deionized water buffered to pH=7.0 in darkness. After 35 hours of exposure to NaOCl, the membrane was thoroughly rinsed with DW, and flux-rejection behavior of the membrane was tested (Table 1).

Example 4

A 5.08 cm diameter disk punched out membrane (GE Osmonics) was sequentially soaked in 2-propanol for 5 min, then in Isopar G™ film (produced by Exxon) 2 times 5 min each, then in 2-propanol 2 times 5 min each, then in methanol for 5 min, then in 1:1 methanol-water mixture for 5 min. Afterwards, the flux-rejection behavior of the membrane was tested (Table 1).

The membrane was kept in 150 ml of 1000 ppm NaOCl solution in DW buffered to pH=7.0 in darkness. After 35 hours of exposure to NaOCl the membrane was thoroughly rinsed with DW, and flux-rejection behavior of the membrane was tested (Table 1).

Example 5

A 5.08 cm diameter disk punched out membrane (GE Osmonics) was treated as described in Example 4 except the membrane was kept in 150 ml of 1000 ppm NaOCl solution in DW (pH=8.2) in darkness for 35 hours before flux-rejection behavior of the membrane was tested (Table 1).

Example 6

A 5.08 cm diameter disk punched out membrane (GE Osmonics) was sequentially soaked in 2-propanol for 5 min, then in Isopar G™ film (Exxon) 2 times 5 min each, then in 100 ml of 5 wt % benzoyl chloride solution in Isopar G™ for 30 min, then in Isopar G™ for 5 min, then in 2-propanol 2 times 5 min each, then in methanol for 5 min, then in 1:1 methanol-water mixture for 5 min. Afterwards, the flux-rejection behavior of the membrane was tested (Table 1).

The membrane was kept in 150 ml of 1000 ppm NaOCl solution in DW buffered to pH=8.0 in darkness. Flux-rejection behavior of the membrane was tested after 35 hours, 70 hours, 120 hours and 168 hours of exposure to NaOCl (Table 1).

Example 7

A 5.08 cm diameter disk punched out membrane (GE Osmonics) was treated as described in Example 6 except 5 wt % benzene sulfonyl chloride solution in Isopar G™ was used instead of 5 wt % benzoyl chloride solution in Isopar G™.

The membrane was kept in 150 ml of 1000 ppm NaOCl solution in DW buffered to pH=8.0 in darkness. Flux-rejection behavior of the membrane was tested after 35 hours, 70 hours, 120 hours, and 168 hours of exposure to NaOCl (Table 1).

Example 8

A 5.08 cm diameter disk punched out membrane (GE Osmonics) was treated as described in Example 6 except 2.5 wt % isophthaloyl chloride solution in Isopar G™ was used instead of 5 wt % benzoyl chloride solution in Isopar G™.

The membrane was kept in 150 ml of 1000 ppm NaOCl solution in DW (pH=8.2) in darkness. Flux-rejection behavior of the membrane was tested after 35 h, 70 hours, and 120 hours of exposure to NaOCl (Table 1).

Example 9

A 5.08 cm diameter disk punched out membrane (GE Osmonics) was treated as described in Example 6 except 5 wt % phenylchloroformate solution in Isopar G™ was used instead of 5 wt % benzoyl chloride solution in Isopar G™.

The membrane was kept in 150 ml of 1000 ppm NaOCl solution in DW buffered to pH=8.0 in darkness. Flux-rejection behavior of the membrane was tested after 70 hours, 120 hours, and 168 hours of exposure to NaOCl (Table 1).

Example 10

A 5.08 cm diameter disk punched out membrane (GE Osmonics) was treated as described in Example 6 except 5 wt % benzylchloroformate solution in Isopar G™ was used instead of 5 wt % benzoyl chloride solution in Isopar G™.

The membrane was kept in 150 ml of 1000 ppm NaOCl solution in DW buffered to pH=7.0 in darkness. Flux-rejection behavior of the membrane was tested after 70 hours, 120 hours, and 168 hours of exposure to NaOCl (Table 1).

Example 11

A 5.08 cm diameter disk punched out membrane (GE Osmonics) was soaked in 1% wt. triethylamine solution in DW for 10 min and was then dried at room temperature for 20 min. Dry swollen membrane was sequentially soaked in 100 ml of 5 wt % benzoyl chloride solution in Isopar G™ for 30 min, then in Isopar G™ for 5 min, then in 2-propanol 2 times 5 min each, then in methanol for 5 min, then in 1:1 methanol-water mixture for 5 min. Afterwards, the flux-rejection behavior of the membrane was tested (Table 1).

The membrane was kept in 150 ml of 1000 ppm NaOCl solution in DW buffered to pH=8.0 in darkness. Flux-rejection behavior of the membrane was tested after 70 hours and 120 hours of exposure to NaOCl (Table 1).

Example 12

Dry flat-sheet membrane was clipped between two 20.5 cm×28 cm aluminum frames. DW was poured onto the face at a depth of about 0.5 cm and allowed to soak for 20 minutes. A 1% wt solution of the benzenesulfonyl chloride was freshly made in MeOH with 0.2% wt triethylamine. Water was removed from the face of the membrane by simply draining for a few seconds. The MeOH solution containing the benzenesulfonyl chloride was poured on the face of the membrane to a depth of about 0.3 sm and allowed to be in contact with the membrane for 2 minutes. The methanol solution was poured off and then the membrane face and back-side were rinsed with excess water.

A 5.08 cm diameter disk punched out this flat sheet was kept in 150 ml of 1000 ppm NaOCl solution in DW buffered to pH=8.0 in darkness. Flux-rejection behavior of the membrane was tested after 70 hours and 120 hours of exposure to NaOCl (Table 1).

Example 13

Wet flat-sheet polysulfone ultra-filtration membrane was clipped between two 20.5 cm×28 cm aluminum frames. Excess of water was removed from the face of the membrane first by shaking and then by gentle wiping. 80 ml of aqueous solution containing 10.0 wt % of iso-propanol, 2.0 wt % of meta-phenylenediamine and 0.3 wt % of 2-ethylhexa-1,3-diol, were poured onto the face of the membrane and allowed to soak for 30 seconds. The solution was poured off the membrane and was allowed to drain off for two minutes. Residual drops were removed by gentle wiping with thin paper. 70 ml of a 0.11 wt % solution of trimesoyl chloride in Isopar G™ were poured onto the face of the membrane and allowed to soak for 30 seconds. The solution was poured off the membrane and was allowed to drain off for two minutes. The membrane was dried in vertical position on air for 5 minutes and then in horizontal position at 95° C. for 4 minutes.

Example 14

A 5.08 cm diameter disk punched out membrane described in Example 13 was kept in 150 ml of 1000 ppm NaOCl solution in deionized water (pH=8.2) in darkness. After 168 hours of exposure to NaOCl the membrane was thoroughly rinsed with DW, and flux-rejection behavior of the membrane was tested (Table 1)

Example 15

A 5.08 cm diameter disk punched out membrane described in Example 13 was sequentially soaked in 2-propanol for 5 min, then in Isopar G™ 2 times 5 min each, then in 100 ml of 5 wt % benzoyl chloride solution in Isopar G™ for 30 min, then in Isopar G™ for 5 min, then in 2-propanol 2 times 5 min each, then in methanol for 5 min, then in 1:1 methanol-water mixture for 5 min. Afterwards, the flux-rejection behavior of the membrane was tested (Table 1).

The membrane was kept in 150 ml of 1000 ppm NaOCl solution in DW (pH=8.2) in darkness. After 168 hours of exposure to NaOCl the membrane was thoroughly rinsed with DW, and flux-rejection behavior of the membrane was tested (Table 1).

Example 16

A 5.08 cm diameter disk punched out membrane described in Example 13 was treated as described in Example 15 except 5 wt % benzene sulfonyl chloride solution in Isopar G™ was used instead of 5 wt % benzoyl chloride solution in Isopar G™. After 168 hours of exposure to NaOCl the membrane was thoroughly rinsed with DW, and flux-rejection behavior of the membrane was tested (Table 1).

Example 17

A 5.08 cm diameter disk punched out membrane described in Example 13 was treated as described in Example 15 except 5 wt % phenyl chloroformate solution in Isopar G™ was used instead of 5 wt % benzoyl chloride solution in Isopar G™. After 168 hours of exposure to NaOCl the membrane was thoroughly rinsed with DW, and flux-rejection behavior of the membrane was tested (Table 1).

Example 18

A 5.08 cm diameter disk punched out membrane described in Example 13 was treated as described in Example 15 except 5 wt % benzyl chloroformate solution in Isopar G™ was used instead of 5 wt % benzoyl chloride solution in Isopar G™. After 168 hours of exposure to NaOCl the membrane was thoroughly rinsed with DW, and flux-rejection behavior of the membrane was tested (Table 1).

TABLE 1

| Example | Initial performance | | After 35 hours in 1000 ppm NaOCl | | After 70 hours in 1000 ppm NaOCl | | After 120 hours in 1000 ppm NaOCl | | After 168 hours in 1000 ppm NaOCl | |
|---|---|---|---|---|---|---|---|---|---|---|
| | % pas | A | % pas | A | % pas | A | % pas | A | % pas | A |
| 1 | 3.7 | 11.8 | 100 | >200 | — | — | — | — | — | — |
| 2 | 3.7 | 11.5 | 100 | >200 | — | — | — | — | — | — |
| 3 | 3.2 | 11.0 | 100 | >200 | — | — | — | — | — | — |
| 4 | 8.5 | 15.5 | 100 | >200 | — | — | — | — | — | — |
| 5 | 8.0 | 16.5 | 100 | >200 | — | — | — | — | — | — |
| 6 | 16.9 | 8.5 | 55.1 | 1.9 | 32.4 | 2.7 | 22.8 | 7.4 | 100 | >200 |
| 7 | 25.8 | 10.2 | 21.6 | 3.5 | 22.9 | 4.3 | 40.7 | 20.5 | 100 | >200 |
| 8 | 18.9 | 15.2 | 39.6 | 4.4 | 46.3 | 28.7 | 100 | >200 | — | — |
| 9 | 15.0 | 4.9 | — | — | 55.6 | 1.0 | 32.1 | 8.2 | 48.9 | 17.1 |
| 10 | 16.7 | 3.7 | — | — | 52.6 | 0.6 | 28.4 | 7.6 | 52.2 | 19.9 |
| 11 | 5.6 | 7.6 | — | — | 37.5 | 29.9 | 100 | >200 | — | — |
| 12 | 4.2 | 4.3 | — | — | 33.5 | 25.3 | 100 | >200 | — | — |
| 14 | 7.5 | 11.2 | — | — | — | — | — | — | 90.1 | 26.7 |
| 15 | 25.3 | 8.1 | — | — | — | — | — | — | 49.7 | 8.8 |
| 16 | 34.8 | 5.2 | — | — | — | — | — | — | 57.6 | 56.2 |
| 17 | 25.3 | 5.9 | — | — | — | — | — | — | 34.5 | 9.5 |
| 18 | 30.1 | 3.2 | — | — | — | — | — | — | 34.5 | 3.5 |

While the invention has been described in detail in connection with only a limited number of aspects, it should be readily understood that the invention is not limited to such disclosed aspects. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for producing a polyamide membrane having an A value of <200% and salt passage value of <100% after 168 hours in 1000 ppm of NaOCL, said method comprising: providing a membrane comprising a polymer having at least one amine group; and treating the membrane by:

i. contacting the membrane with a first solvent to remove water therefrom, wherein the first solvent consist essentially of at least one organic solvent and has a Hansen solubility parameter ranging from about 10.0 to about 18.0 $(cal/cm^3)^{1/2}$;

ii. contacting the membrane with an inert solvent to remove the first solvent therefrom; and iii. further contacting the membrane with a mono-functional amine reactive haloformate compound.

2. The method of claim 1, wherein the first solvent has a Hansen solubility parameter in a range from about 10.0 to about 13.0 $(cal/cm^3)^{1/2}$.

3. The method of claim 1, wherein the first solvent comprises at least a solvent selected from a group consisting of ethanol, propanol, isopropanol, butanol, isobutanol, sec-butanol, pentanol, tetrahydrofuran, 1,4-dioxane, 1,3-dioxane, and pyridine.

4. The method of claim 1, wherein the inert solvent comprises at least a solvent selected from a group consisting of an aliphatic hydrocarbon, an aromatic hydrocarbon, a heterocyclic hydrocarbon, an ether, a cyclic ether, a thioether, a cyclic thioether, a halogenated hydrocarbon, and a carboxylic acid N,N-dialkylamide, wherein the number of carbons is in a range from about 6 to about 20.

5. The method of claim 1, further comprising contacting the membrane with a second solvent having a Hansen solubility parameter in a range from about 22.0 to about 14.0 $(cal/cm^3)^{1/2}$.

6. The method of claim 5, wherein the second solvent comprises a protic solvent.

7. The method of claim 5, wherein the second solvent further comprises water.

8. The method of claim 5, wherein the second solvent further comprises an alcohol and water.

9. The method of claim 8, wherein the alcohol comprises methanol.

10. The method of claim 1, wherein the polymer is selected from a group consisting of polyamide, polysulfonamide, polyacyl hydrazide, polyurethane, polyurea, and polyesteramide.

11. The method of claim 1, wherein the treated membrane is a membrane selected from a group consisting of a reverse osmosis membrane, hyperfiltration membrane, and nanofiltration membrane.

12. The method of claim 1, wherein mono-functional amine reactive haloformate compound is a chloroformate.

13. The method of claim 1, wherein mono-functional amine reactive haloformate compound is phenyl chloroformate.

14. The method of claim 1, wherein mono-functional amine reactive haloformate compound is benzyl chloroformate.

* * * * *